Dec. 30, 1941.  H. M. EVJEN  2,268,138
ELECTRICAL WELL-LOGGING SYSTEM
Filed Dec. 11, 1939
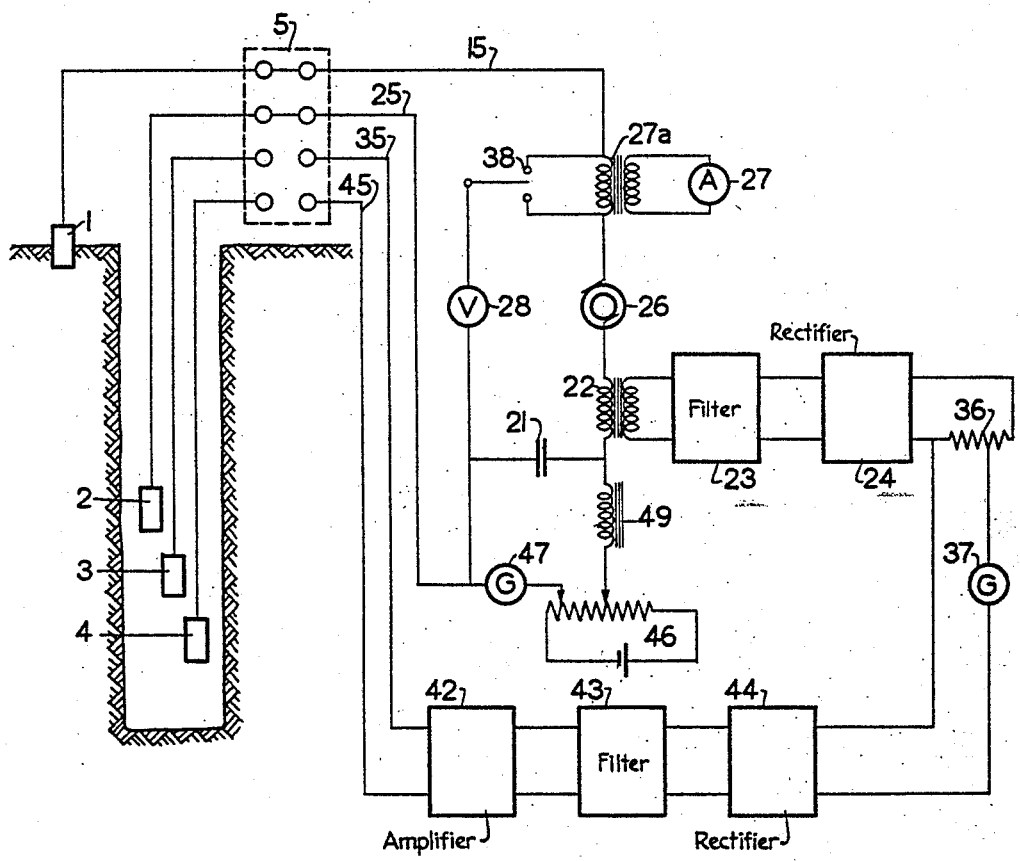
Inventor: Haakon Muus Evjen
By his Attorney Patented Dec. 30, 1941

2,268,138

UNITED STATES PATENT OFFICE 2,268,138

ELECTRICAL WELL-LOGGING SYSTEM

Haakon Muus Evjen, Houston, Tex., assignor to Shell Development Company, San Francisco, Calif., a corporation of Delaware Application December 11, 1939, Serial No. 308,520

3 Claims. (Cl. 175—182)

This invention pertains to improvements in methods for electrically exploring underground structures, and relates more specifically to a system whereby all the essential data necessary for logging or coring the earth formations traversed by uncased boreholes filled with a fluid may be obtained in a single operation or run.

In order to obtain a reasonably complete criterion for purposes of correlation and determination of water and oil-bearing strata, it is necessary to obtain by electrical logging methods indications as to the following quantities:

1. The formation resistivity in a relatively limited flooded zone immediately adjacent the borehole and invaded by the fluid filling the borehole;
2. The true formation resistivity in a relatively extended zone in the vicinity of the borehole and separated therefrom by said first zone; and
3. The spontaneous potential difference existing between a point in the borehole and a point at or near the surface of the ground outside the borehole, or between two points in the borehole, this potential difference being due to the contact electromotive forces between the fluid in the borehole and the logging electrodes lowered thereinto, and/or to the electrical phenomena such as electro-filtration and electro-osmosis which occur spontaneously at the level of porous strata when the borehole is filled with fluid.

Consequently, a complete electrical survey entails at least three types of separate measurements resulting in a log comprising a so-called lateral penetration curve, a resistivity curve, and a spontaneous potential curve.

Heretofore, it has been customary to measure only two of said quantities simultaneously, the third quantity being measured subsequently with a modified arrangement of apparatus. This procedure required, therefore, two separate runs into the borehole with the measuring electrodes and cables, and resulted in a loss of valuable drilling time and an increase in the cost of electrical logging surveys.

It is, therefore, an object of this invention to provide an improved method and apparatus whereby at least three separate measurements may be effected simultaneously to give a complete electrical log of the formations traversed by a borehole.

It is also an object of this invention to provide an electrical logging system involving the use of direct and alternating current devices whereby various electrical phenomena occurring spontaneously or caused by the passage of electrical currents in the borehole and adjacent formations may be separated from each other, the independent values observed or registered for each of said phenomena not being affected by the manipulations necessary for simultaneously measuring the other independent values.

These and other objects of the present invention will be understood from the following description taken with reference to the annexed drawing, showing diagrammatically the arrangement of apparatus used in practicing the present invention.

The drawing shows a fluid-filled borehole 6, and electrodes 1, 2, 3 and 4 in contact with the borehole fluid or with the ground, preferably at or near the surface, and at a desired distance from the borehole. The electrodes are supported and/or electrically connected in the desired circuit by means of insulated cables 15, 25, 35 and 45, or by means of mutually insulated conductors within a single cable, to the power supply and the indicating and recording circuits on the surface. A switch panel 5 is interposed between the commutator and the electrodes, whereby the connections to the latter may be quickly and conveniently interchanged in any desired manner. It is understood that the cables are associated with any and all desired means for lowering or raising said electrodes in the well and for varying the spacing between said electrodes.

One of the terminals of a source of alternating current such, for example, as an oscillator or alternator 26, is connected through conductor 15 to one of the electrodes, for example, electrode 1, while its other terminal is connected to another electrode, for example, electrode 2, through a condenser 21 and conductor 25. A potentiometer arrangement 46, comprising a D. C. galvanometer 47, is connected in parallel with condenser 21. The intensity of the alternating current forced by alternator 26 between the electrodes 1 and 2 is measured by an ammeter 27, or other suitable A. C. indicating or recording device, which may be of the transformer type, as indicated at 27a. The potential difference impressed by the A. C. generator 26 across the electrodes 1 and 2 is measured by a voltmeter 28, or other suitable A. C. indicating or recording device, the voltage drop across the ammeter 27—27a being included or excluded from said potential difference by means of a double-throw switch 38.

A transformer 22 is connected in series with the alternator 26, and has its secondary connected, through a filter 23 and a rectifier 24, to a potentiometer arrangement 36 comprising a D. C. galvanometer 37, or other suitable D. C. indicating or recording device.

The two other electrodes, for example, electrodes 3 and 4, are connected, through conductors 35 and 45, and amplifier 42, filter 43, and rectifier 44, to said potentiometer arrangement 36—37, whereby the potential difference between electrodes 3 and 4, suitably amplified and rectified, may be balanced against any desired fraction or derivative of the rectified alternating current flowing between electrodes 1 and 2.

With the apparatus connected as shown in the drawing, it is, therefore, possible to measure or to record automatically the following values:

1. The impedance to alternating current of the circuit comprising electrodes 1 and 2 as indicated by the A. C. ammeter 27 and voltmeter 28. In well-known manner (see, for example, Franz Ollendorff, Erdstrome, Julius Springer, 1938), the impedance of grounded electrodes depends on the resistivity of the adjoining ground. These measurements will refer mainly to the resistivity of the formations through one lateral depth of investigation close to the electrode 2 in the borehole 6.

2. The rectified alternating potential difference generated between the potential electrodes 3 and 4 by the flow of the exciting alternating current flowing between the current electrodes 1 and 2, which is measured, and/or recorded, by means of the D. C. galvanometer 37, by balancing against a derivative of a fraction of said exciting current after the latter had been likewise rectified by rectifier 24. From this measured potential difference, it is possible to determine, according to well-known methods (see, for example, Patent No. 1,819,923 to Schlumberger) the resistivity of the formation at a greater lateral depth of investigation than that aforementioned.

3. The spontaneous potential existing in the ground between electrodes 1 and 2. This unidirectional potential difference and its measurement or recording by means of the D. C. galvanometer 47 are not affected by the alternating current flowing in the circuit of the electrodes 1 and 2, since this alternating current is substantially by-passed through the parallel branch comprising the condenser 21, the readings of the galvanometer 47 being further stabilized, if desired, by the insertion of a choke-coil 49 in series therewith.

The purpose of the filters 23 and 43 is to eliminate currents generated by stray alternating fields. These filters are accordingly selected with such constants that they pass substantially only alternating currents of the frequency generated by the alternator 26. The frequency of the alternator or oscillator 26 should be sufficiently high so that efficient filters of a manageable size may be used. The amplifier 42 and the filter 43 may be, if desired, partly or wholly interchanged according to the best practices of the art. Thus, it may some times be preferable to effect filtering before amplification in order not to overload the amplifier. The use of a tuned amplifier has well-known advantages which may be effectively utilized in the present system.

The rectifiers 24 and 44, which may be of any desired type, should be selected so as to give a response having substantially linear characteristics, that is, the potential output of the rectifier 24 should be substantially proportional to the alternating current flowing through the primary of the transformer 22, while the potential output of the rectifier 44 should be substantially proportioned to the potential input in the amplifier 42.

It is understood that any of the indicating devices used in the circuits described above may be of the automatically recording or oscillograph type, according to principles well known in the art.

It is also understood that the connection to the electrodes may be interchanged in any desired manner by means of the switch panel 5, whereby a series of valuable checks may be obtained by repeating measurements with modified connections, and different or modified quantities may be measured. Thus, by interchanging the connections to electrodes 1 and 2 with those to electrodes 3 and 4, a series of measurements referring essentially to the two deeper electrodes may be obtained, and, for example, instead of the spontaneous potential between a point at the surface and a point in the borehole, the spontaneous potential difference between two points in the borehole may be measured.

It is also understood that the amplifier 42, filter 43 and rectifier 44 may be constructed in a compact form and lowered into the borehole together with the electrodes. In this way, errors due to inductive pick-up in the long parallel conductors in the borehole may be eliminated or minimized. Furthermore, to reduce the error due to ohmic leakage between the conductors, the latter may be shielded and the shield connected to a neutral point, in a manner well known in the art.

I claim as my invention:

1. In a method for electrically logging formations traversed by a borehole containing a fluid, the steps of maintaining a plurality of electrodes in contact with the borehole fluid and the ground in a region comprising said borehole and a zone surrounding said borehole, passing an alternating current between a first pair of electrodes, detecting the spontaneous potential existing between said first electrodes, separating the direct current due to said spontaneous potential from said alternating current and separately indicating said spontaneous potential and the potential and intensity of said alternating current, rectifying a portion of said alternating current, detecting between a second pair of electrodes the alternating potential generated therebetween by the flow of the alternating current between the first electrodes, rectifying said detected alternating potential, and indicating said rectified alternating potential by balancing it against a potential derived from the rectified portion of the alternating current flowing between the first electrodes.

2. In an electrical circuit for logging formations traversed by a borehole containing a fluid, at least one electrode in contact with the ground at the surface thereof and a plurality of cable supported electrodes within the fluid-filled borehole, means for passing an alternating current between a pair of said electrodes, means for rectifying a portion of said current, means for indicating the impedance to the flow of the alternating current between said electrodes, direct current means for indicating the spontaneous potential difference existing between said two electrodes, filtering means for separating the alternating and the direct current flowing between said two electrodes, means comprising a second pair of electrodes for detecting the alternating current potential generated therebetween by the flow of the alternating current between the first two electrodes, means for rectifying said alternating potential and means for indicating said rectified alternating potential by balancing the output of said first rectifying means against the output of said second rectifying means.

3. In an electrical circuit for logging formations traversed by a borehole containing a fluid, at least one electrode in contact with the ground at the surface thereof and a plurality of cable supported electrodes within the fluid-filled borehole, means for generating and passing an alternating current between a pair of said electrodes, means for indicating the intensity and the potential of said alternating current, direct current means for indicating the spontaneous potential difference existing between said two electrodes, filtering means for separating the alternating and the direct current flowing between said two electrodes, filtering means for separating and by-passing a portion of said alternating current at substantially the frequency of said generating means, means for rectifying said by-passed portion, means comprising a second pair of electrodes for detecting the alternating potential generated therebetween by the flow of the alternating current between the first electrodes, means to amplify said alternating potential, filtering means for by-passing said alternating potential at substantially the frequency of said generating means, means for rectifying said alternating potential, and means for indicating said alternating potential by balancing the output of said first rectifying means against the output of said second rectifying means.

HAAKON MUUS EVJEN.